(12) United States Patent
Murofushi et al.

(10) Patent No.: US 7,250,864 B2
(45) Date of Patent: Jul. 31, 2007

(54) READING/WRITING APPARATUS OF TAG UNIT

(75) Inventors: Nobuo Murofushi, Shizuoka-ken (JP);
Kouichi Sano, Shizuoka-ken (JP);
Yasuo Matsumoto, Shizuoka-ken (JP);
Yasuhito Kiji, Shizuoka-ken (JP)

(73) Assignee: Toshiba TEC Kabushiki Kaisha, Tokyo (JP)

( * ) Notice: Subject to any disclaimer, the term of this patent is extended or adjusted under 35 U.S.C. 154(b) by 106 days.

(21) Appl. No.: 11/075,822

(22) Filed: Mar. 9, 2005

(65) Prior Publication Data
US 2005/0234587 A1    Oct. 20, 2005

(30) Foreign Application Priority Data
Mar. 31, 2004    (JP)    ............... 2004-106542

(51) Int. Cl.
*G08B 13/14*    (2006.01)
(52) U.S. Cl. ............... 340/572.1; 340/10.1; 700/215
(58) Field of Classification Search .. 340/572.1–572.9, 340/10.1; 700/215; 235/376
See application file for complete search history.

(56) References Cited

U.S. PATENT DOCUMENTS

| | | | |
|---|---|---|---|
| 5,499,017 A | | 3/1996 | Beigel ..................... 340/572 |
| 5,767,789 A | * | 6/1998 | Afzali-Ardakani et al. 340/10.1 |
| 6,084,530 A | * | 7/2000 | Pidwerbetsky et al. .. 340/10.32 |
| 6,340,931 B1 | * | 1/2002 | Harrison et al. ......... 340/572.1 |
| 6,366,206 B1 | | 4/2002 | Ishikawa et al. ......... 340/573.1 |
| 6,446,208 B1 | | 9/2002 | Gujar et al. ................ 713/185 |
| 7,012,529 B2 | * | 3/2006 | Sajkowsky ............... 340/572.1 |

FOREIGN PATENT DOCUMENTS

| | | |
|---|---|---|
| EP | 1 450 300 A1 | 8/2004 |
| JP | 2002-183695 A | 6/2002 |
| JP | 2002-288598 | 10/2002 |
| JP | 2003-67683 | 3/2003 |
| WO | 02/101641 A1 | 12/2002 |
| WO | 2004/034319 A1 | 4/2004 |

OTHER PUBLICATIONS

Japanese Office Action dated Jul. 25, 2006 of Patent application No. 2004-106542.
European Search Report issued in EP Application No. 05 00 5290 dated Jul. 15, 2005.

* cited by examiner

*Primary Examiner*—Phung T. Nguyen
(74) *Attorney, Agent, or Firm*—Pillsbury Winthrop Shaw Pittman, LLP

(57) ABSTRACT

A tag unit comprises two RFID tags arranged nearly parallel with each other, each RFID tag including an antenna, tag transmission/reception section, and storage section. The tag unit stores different serial numbers in the respective storage sections. A tag unit reading/writing apparatus writes the different serial numbers and common data in the storage sections of the respective RFID tags, and retains the same serial numbers of the respective RFID tags in its storage section 18. The tag unit reading/writing apparatus judges validity of reading and reusability of the tag unit, when it successfully reads both of the serial numbers and the data stored in the storage sections of the respective RFID tags.

3 Claims, 5 Drawing Sheets

READING/WRITING APPARATUS OF TAG UNIT

CROSS REFERENCE TO RELATED APPLICATIONS

This application is based upon and claims the benefit of priority from the prior Japanese Patent Application No. 2004-106542 filed on Mar. 31, 2004, the contents of which are incorporated herein by reference.

FIELD OF THE INVENTION

The present invention relates generally to an RFID tag comprising an antenna and an IC chip that includes a wireless communications section and a storage section, particularly to an RFID tag unit in which a plurality of RFID tags are arranged, RFID tag comprising an antenna and IC chip including a wireless communications section and a storage section, and to an RFID tag unit reading/writing apparatus.

BACKGROUND OF THE INVENTION

An RFID tag structure is described in Japanese patent application Kokai publication No. 2002-183695, in which a plurality of RFID tags, each comprising an antenna and IC chip that includes a wireless communications section and a storage section, are arranged. This RFID tag structure is formed in which there are provided two RFID tags having cylindrical antenna coils whose axes are oriented nearly orthogonal to each other. By arranging two antenna coils nearly orthogonal to each other, reception/transmission sensitivities of the antennae in a direction of an axis of one antenna coil and a direction orthogonal to the axis of the antenna can be made in an almost same degree and thereby a restriction of the antenna directivity has become alleviated. Also, the same addresses and codes are allocated to the two RFID tags, either one of the RFID tags having higher sensitivity first responses to an inquiry that is received and that tag is given precedence. Even if the two RFID tags response simultaneously, no mutual interference occurs because the two have the same addresses and codes.

An RFID tag is generally breakable subject to strong physical or electromagnetic forces. Because, when it is broken down, one can hardly tell by a visual look whether it is still operational or dead, the inventors of the present invention have become aware of necessity of knowing or judging whether or not the tag in such a case is still operational.

In the RFID tag structure as described in the above-mentioned Japanese patent application Kokai publication No. 2002-183695, if one of the two RFID tags becomes broken down, data can still be read from the other one since the two store common data. However, one cannot tell which one is disabled. Besides, if both RFID tags become broken and therefore data is unable to read, one can hardly tell if the RFID tags themselves are dead or an RFID tag reading apparatus has become disabled, or the trouble is due to magnetic interference.

In other words, even if two tags are provided, it cannot be judged that one of the tags is broken down and needs to be replaced, or both are still normal and reusable.

SUMMARY OF THE INVENTION

The present invention provides a tag unit having a plurality of RFID tags, which enables judgment if one of the tags is broken down and needs a replacement or all of the tags are normal and reusable.

The invention also provides a tag unit reading/writing apparatus that can judge if a tag unit is reusable by reading the tag unit.

An object of the present invention is to provide an RFID tag unit in which a plurality of RFID tags are provided, each of which comprises an antenna and an IC chip including a wireless communications section and storage section, the respective storage sections store ID information different from each other, and the respective ID information are combined with common data.

Another object of the present invention is to provide a tag unit reading/writing apparatus that reads data from a tag unit in which a plurality of RFID tags, each comprising an antenna and an IC chip including a tag transmission/reception section and storage section, are provided and the storage sections of the respective RFID tags store ID information different from each other. The tag unit reading/writing apparatus comprises a wireless communications section that communicates with the tag units, a reading part for reading ID information from storage sections of the respective RFID tags through the wireless communications section, a data-writing part for writing common data relating it to the ID information stored in the storage sections of the respective RFID tags, and a storing part for previously storing ID information identical to those in the respective RFID tags relating the respective ID information to each other when the data-writing part writes the data.

DETAILED DESCRIPTION OF THE INVENTION

Figure 1:
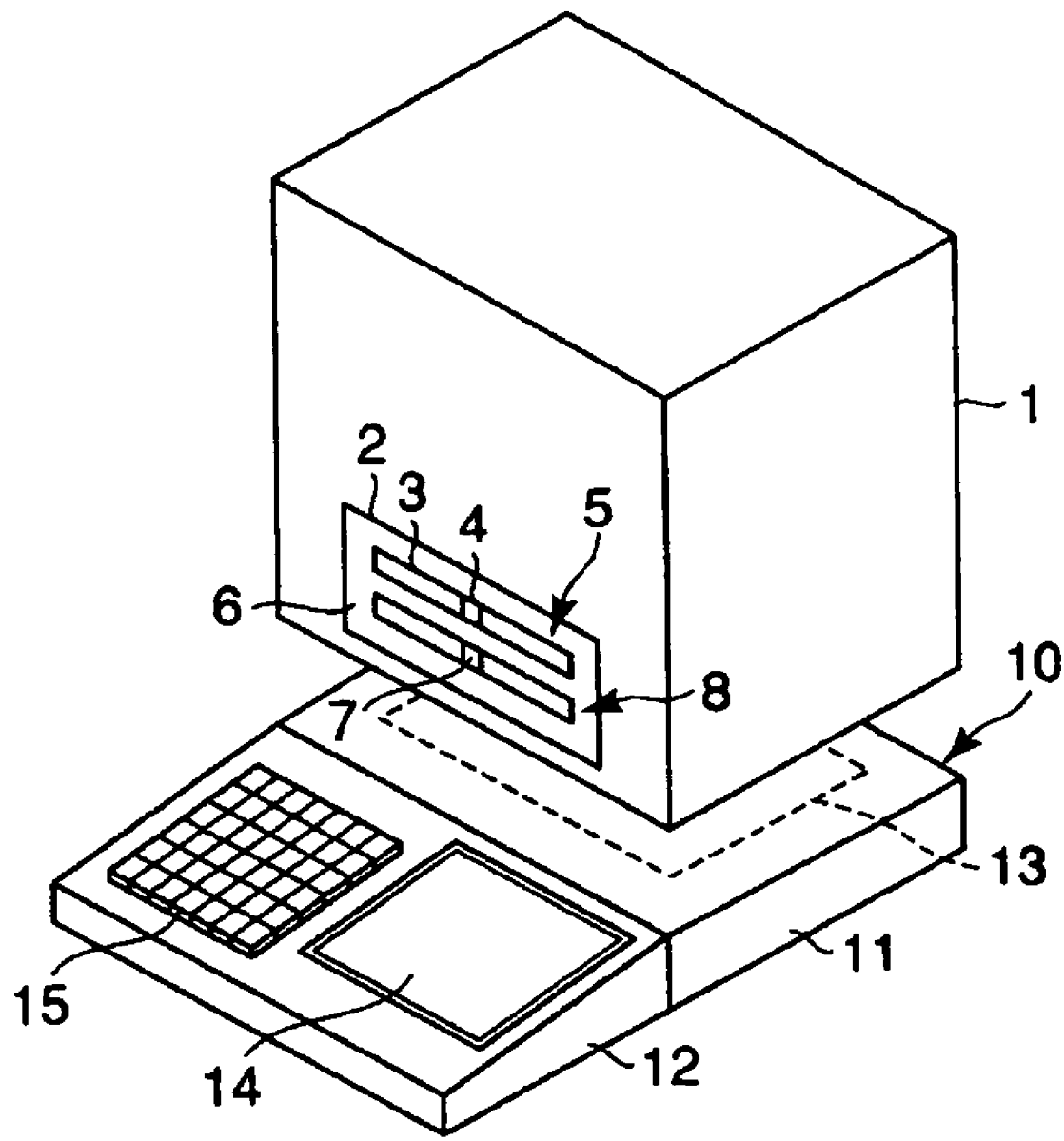
FIG. 1 is a perspective view of a structure in one embodiment according to the present invention.

Preferred embodiments of the present invention will now be described in more detail with reference to the accompanying drawings. The same numerals are applied to the similar elements in the drawings, and therefore, the detailed descriptions thereof are not repeated.

As shown in FIG. 1, a tag unit 2 is detachably affixed to a side of a container 1. The container 1 is used for, for example, containing articles in a production line and for being controlled in a production process by unit of container. This tag unit 2 comprises an RFID tag 5 that consists of an antenna 3 and an IC chip 4 including a tag transmission/reception section and a storage section, and an RFID tag 8 that consists of an antenna 6 and an IC chip 7 including a tag transmission/reception section and a storage section. The two RFID tags 5 and 8 are arranged in nearly parallel so that directivities of the RFID tags are oriented in the same direction.

A tag unit reading/writing apparatus 10, which comprises an apparatus main body 11 and an operation part 12, writes and reads information to/from the tag unit. The apparatus main body 11 is provided with an antenna 13, which is disposed above inside the main body so as to strongly radiate a radio wave upward. The operation part 12 comprises a display section 14 and an input section 15.

Figure 2:
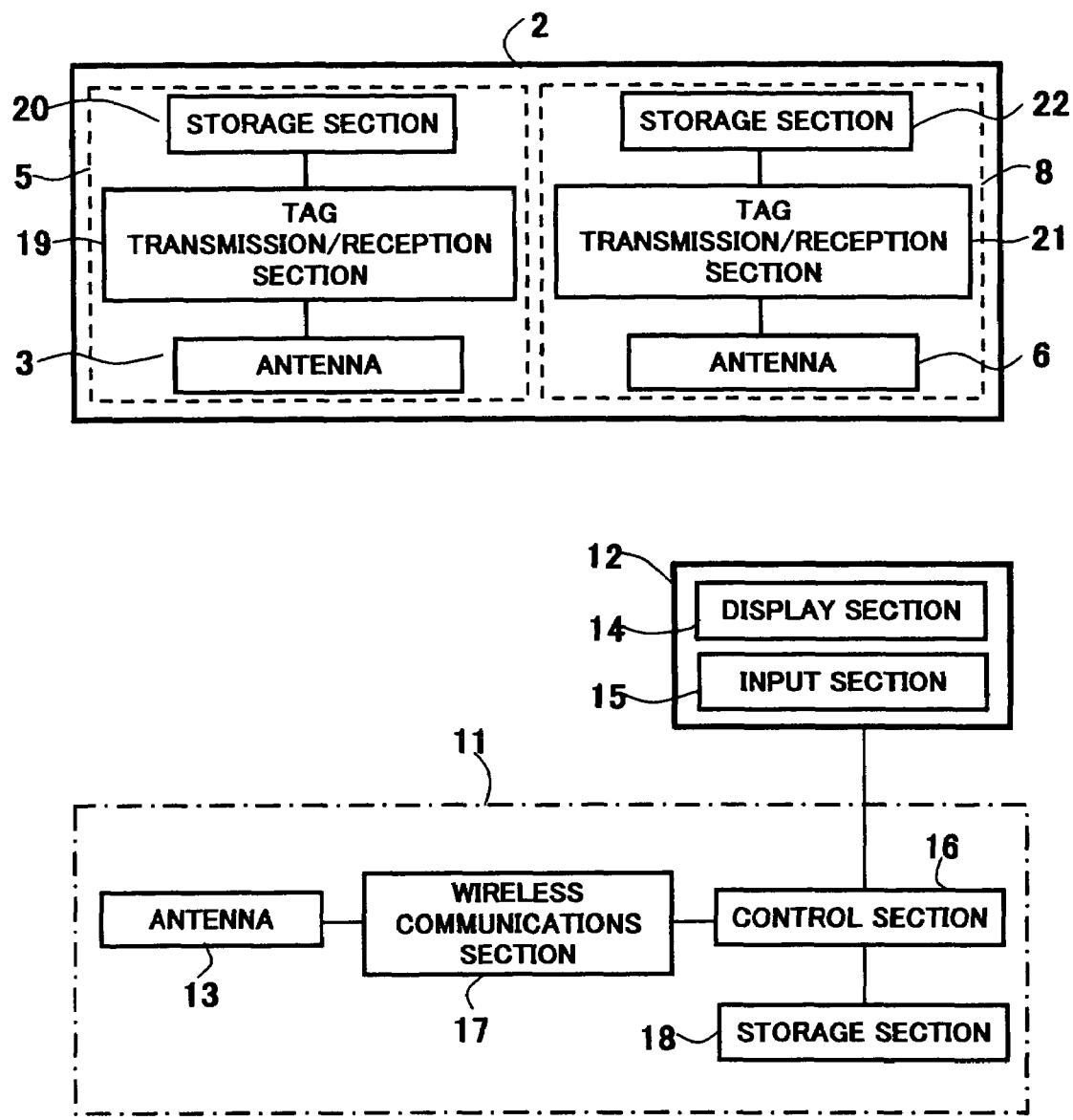
FIG. 2 is a block diagram illustrating controlling structures of the embodiment.

FIG. 2 is a block diagram illustrating structures of the tag unit 2, operation part 12, and apparatus main body 11, also illustrating a system structure for controlling tag unit reading/writing means. The apparatus main body 11 comprises a control section 16, which is a microprocessor, that controls whole apparatus, wireless communications section 17 for controlling wireless communication, an antenna 13 connected to the wireless communications section 17 that transmits and receives data, and a storage section 18 for storing data. The control section 16 is connected to and controls the operation part 12 that consists of the display section 14 and input section 15, the wireless communications section 17, and storage section 18.

The tag unit 2 comprises two RFID tags, 5 and 8. The RFID tag 5 comprises the IC chip 4 consisting of the tag transmission/reception section 19 for controlling wireless communication and the storage section 20, and the antenna 3 connected to the tag transmission/reception section 19. The RFID tag 8 comprises, as in the RFID tag 5, the IC chip 7 that includes the tag transmission/reception section 21 and the storage section 22, and the antenna 6.

The input section 15 of the operation part 12 inputs information to be written to the RFID tags 5 and 8, and programs that the tag unit reading/writing apparatus 10 executes. The display section 14 displays status information, data that have been read, data that have been inputted through the input section 15, and others.

Figure 3:
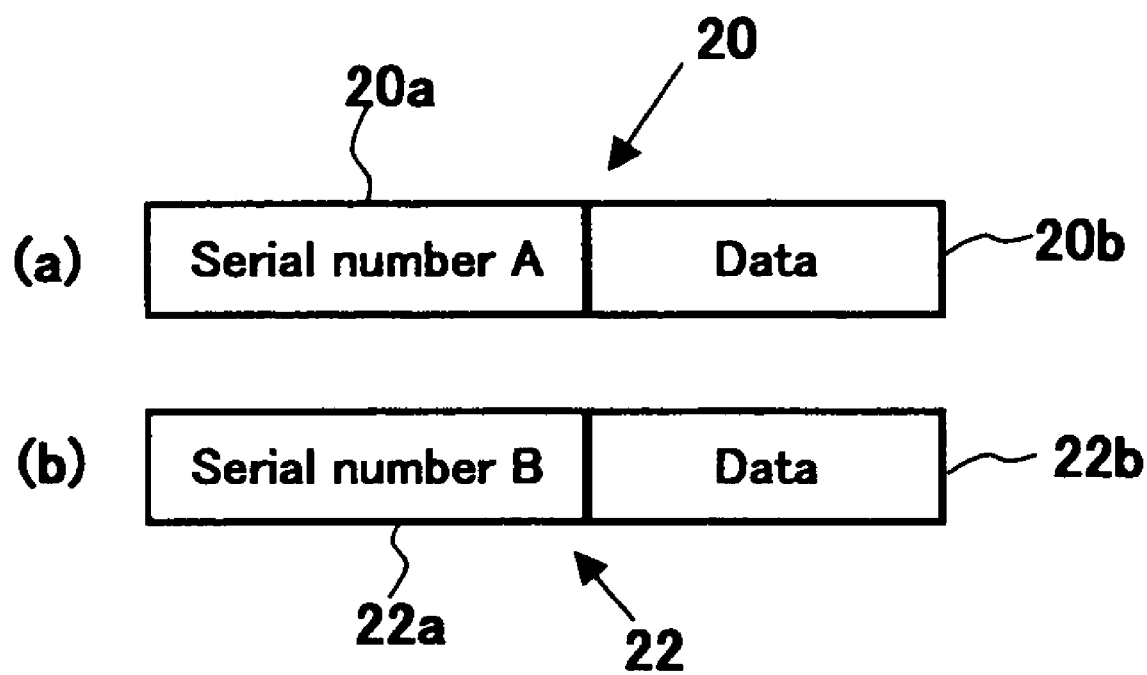
FIG. 3 shows a format of information stored in the storage sections of an RFID tag pertaining to the embodiment.

As shown in FIG. 3(*a*), the storage section 20 of the RFID tag 5 has an area 20*a* for storing a serial number and an area 20*b* for storing data. In the area 20*a*, a serial number A by which an individual RFID tag is identified is previously written. The storage section 22 of the RFID tag 8 has an area 22*a* for storing a serial number and an area 22*b* for storing data, as shown in FIG. 3(*b*). In the area 22*a*, a serial number B is previously written.

When the tag unit reading/writing apparatus 10 reads or writes information from/to RFID tags 5 and 8 of the tag unit 2, the container 1 to which the tag unit 2 is affixed is placed on or in the proximity of the apparatus 10.

When reading information from the respective RFID tags 5 and 8, the control section 16 sends a read command for reading information of an RFID tag to the wireless communications section 17, which in turn transmits information including the read command as an electromagnetic wave through the antenna 13.

The respective antennae 3 and 6 of the RFID tags 5 and 8 in the tag unit 2 receive the electromagnetic wave that is radiated. Upon this reception, the information including the read command is transferred to the tag transmission/reception section 19, and the tag transmission/reception section 19 in turn outputs data stored the storage section 20 to antenna 3 according to the read command. The data is thus radio-transmitted to the tag unit reading/writing apparatus 10 through the antenna 3, and thereby the data reading is achieved. Similarly, information including a read command is transmitted to the tag transmission/reception section 21 through the antenna 6, and the tag transmission/reception section 21 in turn outputs data stored the storage section 22 to the antenna 3 according to the command. The data is thus radio-transmitted to the tag unit reading/writing apparatus 10 through the antenna 6, and thereby data reading is achieved.

When writing information to RFID tags 5 and 8 in tag unit 2, the control section 16 generates a writing command for writing information to the RFID tags, and sends this writing command and information including data to be written to the wireless communications section 17, and controls to transmit the writing command and the information as an electromagnetic wave through the antenna 13.

The radiated electromagnetic wave is received by the respective antennae 3 and 6 of the RFID tags 5 and 8 in the tag unit 2. Following this reception, a writing command and information including data to be written is transmitted to the tag transmission/reception section 19 through the antenna 3, and the tag transmission/reception section 19 in turn writes the data in the area 20*b* of the storage section 20 according to the command. Similarly, a writing command and information including data to be written is transferred to the tag transmission/reception section 21 through the antenna 6, and the tag transmission/reception section 21 in turn writes the data in the area 22*b* of the storage section 22 according to the command.

According to such reading and writing procedures, the control section 16 carries out reading and writing data from/to the respective RFID tags 5 and 8 of tag unit 2.

Figure 4:
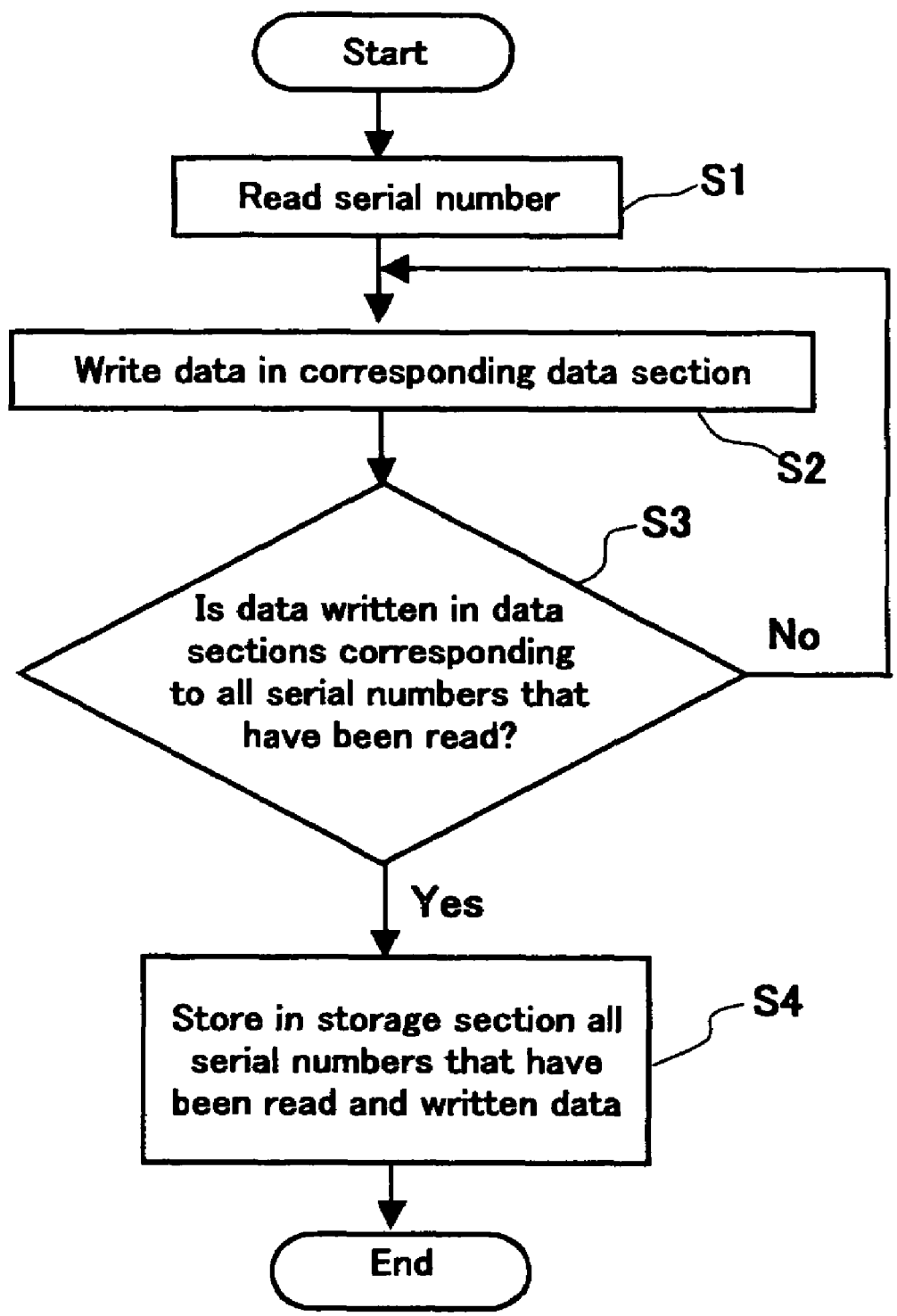
FIG. 4 is a flow chart illustrating a process of writing data to a tag unit by the RFID tag unit reading/writing apparatus pertaining to the embodiment.

The control section 16 carries out processing for writing data to the respective RFID tags 5 and 8 based on the flow chart shown in FIG. 4. In step S1, a reading part reads serial numbers A and B from RFID tags 5 and 8, respectively. These readings are carried out by the anticollision method, which prevents simultaneous readings from a plurality of RFID tags from occurring and thereby colliding each other. This anticollision method includes the bit-retrieving method in which serial numbers are retrieved bit by bit and the aloha method in which the tag transmission/reception sections 19 and 21 return respective serial numbers each responding at own arbitrarily setting time.

In step S2, a writing part writes data either to the storage section 20 of the RFID tag 5 or the storage section 22 of the RFID tag 8. In step S3, it is judged whether data have been written to all the data areas corresponding to all of the serial numbers, and if not, successive data writing is performed returning to step S2.

In step S2, first, data is written to data section 20*b* corresponding to serial number A. In step S3, it is judged that the writing has not been completed yet. According to this judgment, the process control returns to step S2 to successively write data to the data sections 22*b* corresponding to serial number B. In this instance, the contents of the data written in data sections 20*b* and 22*b* are identical to each other.

Back in step S3, it is judged that the writing is now completed. Then, the process control proceeds to step S4, wherein the serial numbers A and B, and data written in the respective data sections 20*b* and 22*b* are stored in a first storage area (a first storing part) within the storage section 18 of the tag unit reading/writing apparatus 10, relating the serial numbers with the data, respectively.

Figure 5:
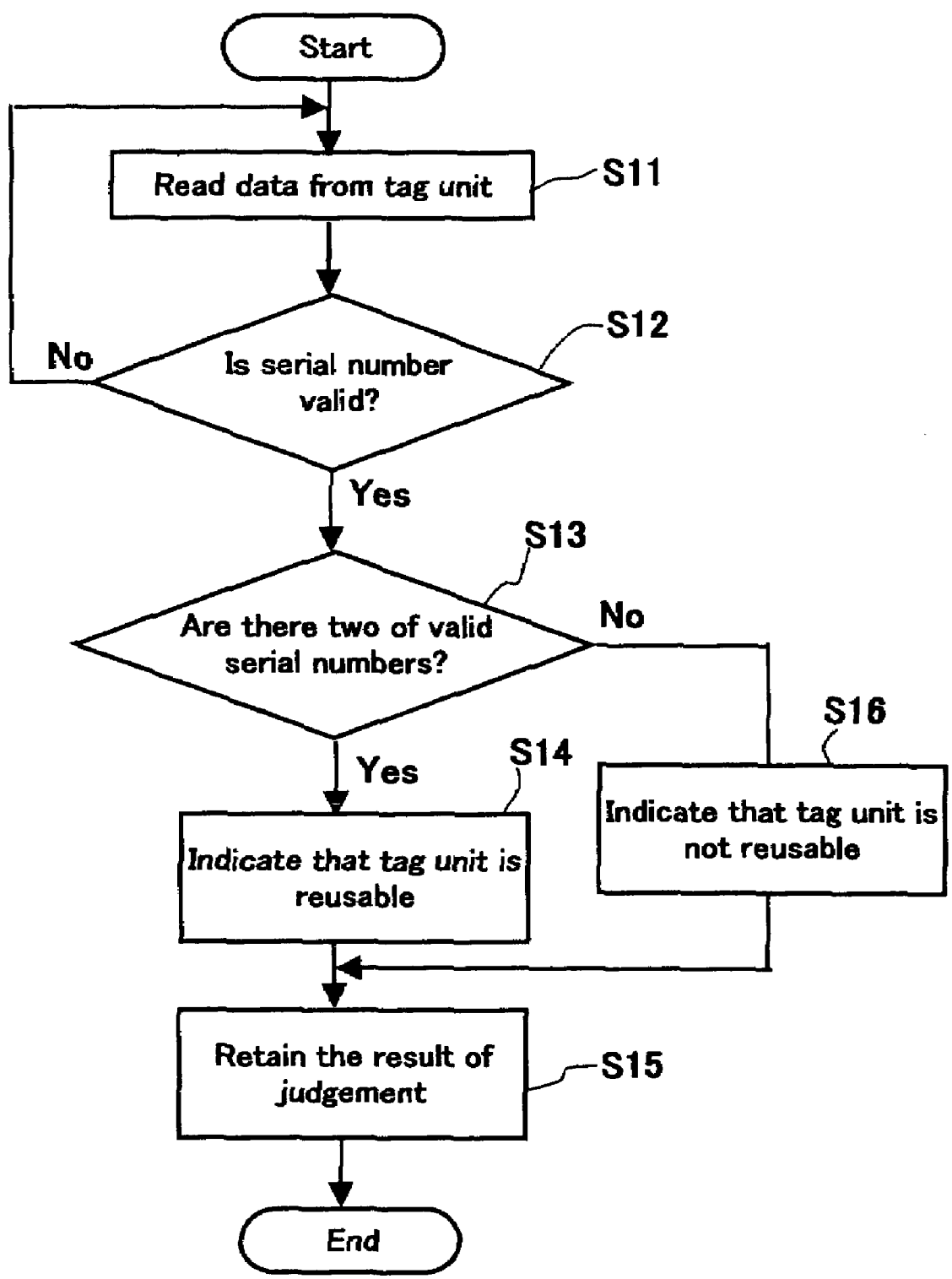
FIG. 5 is a flow chart illustrating a process of confirming reuse of a tag unit by the tag unit reading/writing apparatus pertaining to the embodiment

Whether the tag unit 2 can be reused is determined by the control section 16 according to the flow chart as shown in FIG. 5. In step S11, a reading part reads by the anticollision method the serial numbers and data stored in the storage sections 20 and 22 of the RFID tags 5 and 8 in the tag unit 2.

In step S12, a comparing part compares a serial number having read with a corresponding serial number retained in the storage section 18, and judges if they are matched to each other. This step is addressed to a case where the apparatus has either failed to read a serial number correctly or accidentally read a wrong serial number from a different tag unit that neighbors.

In step S13, a judging part determines if the serial numbers that have been correctly read are two of A and B. If it is determined that there exist the appropriate two, the control section 16 makes the display section 14 to indicate that the tag unit 2 is reusable (S14). Since the number of the RFID tags is two in this case, a predetermined number of the tags to be judged as reusable ones is to be "2." In step S15, a storing part retains the result of the judgment that the tag unit is reusable in the second storage area (a second storing part) of the storage section 18.

In the case that, in step 13, it is so judged that the number of serial numbers that have been correctly read is one, the controller 16 interprets that one of the two is broken down and instructs the display section 14 to indicate that the tag unit 2 is not reusable (S16). In step 15, the storing means retains this result of the judgment in the second storage area of the storage section 18.

The control section 16 of the tag unit reading/writing apparatus 10 uses this tag unit 2 for managing the container 1 by writing the same data to the data sections 20b and 22b within the respective RFID tags 5 and 8 of the tag unit 2. The control section 16 retains the data having been written to the tag unit 2 in the storage section 18, relating the data to the respective serial numbers A and B that are allocated to the RFID tags 5 and 8.

When the management using the container 1 is done, the tag unit 2 is exfoliated from the container 1. To find if this tag unit can be reused, the tag unit 2 is placed on the tag unit reading/writing apparatus 10. The controller 16 reads the serial numbers A and B, and data from the tag unit 2, and compares the serial numbers A and B, and the data that have been read with the corresponding numbers and data retained in the storage section 18. If both of the serial numbers A and B from the tag unit 2 are found identical to serial numbers retained in the counterpart, the control section regards the tag unit 2 is reusable, instructing the display section 14 to indicate so. If only one of the serial numbers A and B from the tag unit is found identical to the serial numbers retained, the control section regards that either one of RFID tags 5 and 8 is broken down and therefore the tag unit 2 is not reusable, instructing the display section 14 to indicate that the tag unit 2 is not reusable.

In the middle of the management work using the container 1, if only one serial number in the two, A and B, is confirmed legitimate after data-reading from the tag unit 2 by the tag unit reading/writing apparatus 10, the work can be continued without being interrupted since the other tag of the pair is still serviceable even if one of them is destroyed. In such a case, it can be known after the management work using the container 1 that this tag unit 2 cannot be reused. If this tag unit 2 is needed to be replaced in the middle of the work, it can be done such that, first, the tag unit 2 is exfoliated from the container 1; then, a new tag unit 2 is affixed to the container 1; and, identical data is rewritten to the storage sections 20 and 22 of the respective RFID tags 5 and 8 in this tag unit 2.

In the case that the tag unit reading/writing apparatus 10 cannot read serial numbers from the tag unit 2 at all, it would be presumed that it is due to either occurrence of radiowave inference or breakdown of the tag unit reading/writing apparatus 10.

As described above, by using two RFID tags one can easily find whether the tag unit 2 can be reused or it needs to be replaced. Moreover, since identical data is stored in the two RFID tags 5 and 8, the management work as is using the data can be continued even if one of the two is broken down.

In the above embodiment, description was made for use of the tag unit in which two RFID tags are arranged. However, the present invention is not limited to such a practice, and arrangement of three or more RFID tags may be employed. In the arrangement of three RFID tags, possibility of reuse of the tag unit may be judged if at least two of them operate normally.

Although in the above embodiment identical data is stored in the two RFID tags 5 and 8, this invention is not restricted to such a practice. It can be practiced in a way that only serial numbers are stored in the storage sections 20 and 22 of tag unit 2, while data is written in the storage section 18 of the tag unit reading/writing apparatus 10, relating the data with the serial numbers. Even in this case, since the corresponding data can be obtained by reading the serial numbers from the RFID tags, the management work using such data can be achieved without any difficulties.

In the above embodiment, the serial numbers A and B are arbitrarily selected. If two serial numbers are consecutive, validity of at least second serial number that has been read can be judged without a need of storing the second number in the storage section 18. In addition, although, in the above embodiment, serial numbers were used as the identifications of the respective RFID tags within the tag unit, the invention is not limited to this application. Instead, symbols or a combination of a number and symbol may be used as well.

In the above-mentioned embodiment, the tag unit reading/writing apparatus 10 stores serial numbers and data that have been read from the respective RFID tags 5 and 8 to the storage section 18, relating the respective serial numbers with the data. However, it can be configured such that the tag unit reading/writing apparatus 10 is connected to a server through a network and serial numbers and data read by the server are retained as the numbers and data are related to each other. If a system is configured such that a plurality of the tag unit reading/writing apparatuses 10 are connected on a network, any one of the tag unit reading/writing apparatuses 10 can determine whether one tag unit is reusable or need to be replaced. This system is suitable for the case where the container is moved through different process steps in a production line, and data of the tag unit is managed between the steps.

If a longitudinal direction of the tag unit whose antennae are arranged nearly parallel with each other is oriented orthogonal to a plane of the antenna 13, RFID tags cannot be read out due to directivity of the antennae. In order for that at least one RFID tag can be read in any directions, that RFID tags 5 and 8 are arranged in different directions can be thought. In this case, however, if one of the RFID tags is happened to be oriented orthogonal to a plane of the antenna 13, that tag cannot be read due to the antenna arrangement of different directions. To enable reading of the two RFID tags 5 and 8 at a time, planes of a plurality of the antennae 13 would be arranged so as not to parallel each other. Use of these antennae can be made such that only one of the antennae 13 is used in the middle of the process, while a plurality of the antennae 13 are arranged only where reuse of the tag unit needs to be determined.

Numerous modifications and variations of the present invention are possible in light of the above teachings. It is therefore to be understood that, within the scope of the appended claims, the present invention can be practiced in a manner other than as specifically described therein.

What is claimed is:

1. A tag unit reading/writing apparatus comprising:
   a wireless communications section for radio-communicating with a tag unit including at least two RFID tags, each tag comprising an antenna and an IC chip that includes a tag transmission/reception section and a tag storage section, the storage sections of the respective RFID tags storing a unique ID information different from each other;
   a reading part for reading the ID information from the tag storage sections of the respective RFID tags in the tag unit through said wireless communications section;
   a storing part for storing ID information identical to the ID information in the respective RFID tags before reading one from the RFID tags, relating the ID information one to another;
   a comparing part for comparing the respective ID information read from the RFID tags by said reading part with the respective ID information being related to each other previously stored by the storing part; and
   a judging part for judging that the tag unit is reusable if a number of matching of the IDs is more than or equal to a predetermined number.

2. A tag unit reading/writing apparatus according to claim 1, wherein the judging part judges that the tag unit is not reusable if the number of matching of the IDs is less than the predetermined number.

3. A tag unit reading/writing apparatus according to claim 2, further including a second storing part for storing a result of the judgment by said judging part.

* * * * *